Dec. 20, 1949     D. E. BELL     2,491,703
COLLAPSIBLE NET-CARRYING STRUCTURE
Filed Nov. 4, 1946
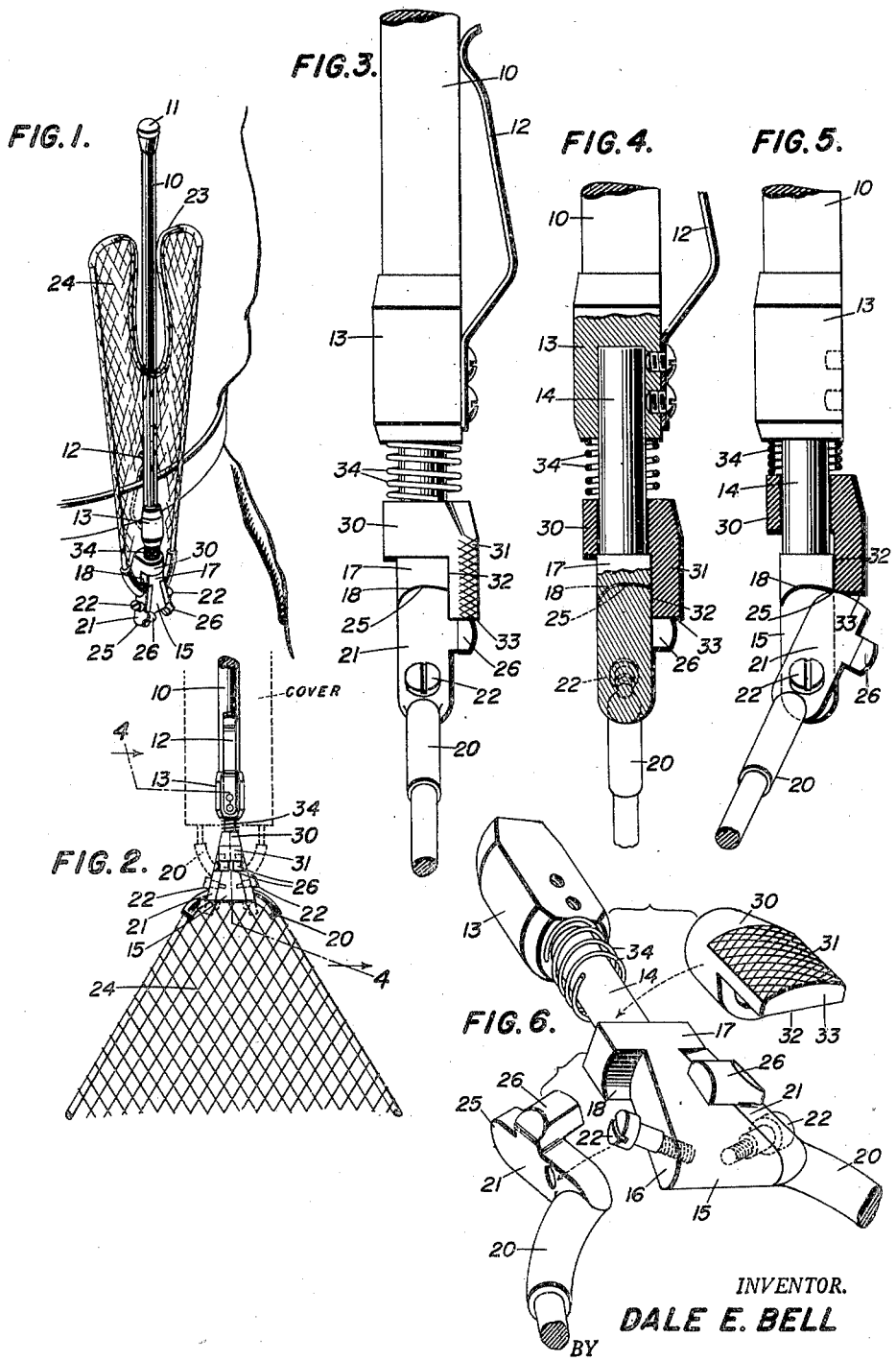
INVENTOR.
DALE E. BELL
BY
Fisher & Christen,
Attorneys.

Patented Dec. 20, 1949

2,491,703

UNITED STATES PATENT OFFICE 2,491,703

COLLAPSIBLE NET-CARRYING STRUCTURE

Dale E. Bell, Grinnell, Iowa

Application November 4, 1946, Serial No. 707,743

1 Claim. (Cl. 43—12)

This invention relates to collapsible net structures and has particular relation to a collapsible dip net, for catching fish, butterflies and the like.

Present net carrying structures have the disadvantage that they require both hands of the user to either collapse the net arms in folded position, or to open the net arms in locked position. Moreover, present net carrying structures have the further disadvantage that they cannot be readily collapsed or positively locked merely by the application of force by one finger of one hand of the user.

An object of the present invention is to provide a novel hinge structure which is particularly adapted for use in a dip net.

Another object of the invention is to provide a dip net which may be readily collapsed and extended by one hand of the user.

A further object of the present invention is to provide a net supporting device which may be readily collapsed and positively locked by the application of force by one finger of one hand of the user.

These and other objects of the invention will be readily understood by reference to the following description and accompanying drawings, in which:

Figure 1 is a perspective view of the improved dip net, particularly illustrating the folded position of the parts and showing the net readily mounted for carrying;

Fig. 2 is a plan view of the net in its extended position, the parts being viewed from the inside of the structure shown in Fig. 1;

Fig. 3 is a side elevation of the hinge and latch portion of the net, the net carrying arms being shown in extended position;

Fig. 4 is a longitudinal section taken on the line 4—4 of Fig. 2;

Fig. 5 is a partially sectional and elevational view of the hinge structure, illustrating the act of retracting the latch sleeve and showing the net carrying arms in partially collapsed position; and Fig. 6 is an exploded perspective view of the hinge and latch assembly.

The folding net of the present invention generally comprises a handle, a yoke carried by the handle and provided with diverging faces, diverging, net-carrying arms pivoted to said yoke and bearing against said diverging faces, the arms being extended inwardly beyond their pivots to form locking studs, abutment means cooperating with the locking studs for limiting the unfolding movement of the diverging arms, and a locking member slidable longitudinally of the handle and engageable with the locking studs for locking the diverging arms in extended position.

Referring now to the drawings:

Figs. 1 to 6 illustrate an embodiment of the present invention adapted for use in a dip net which includes a handle 10 conveniently provided with a frictional base cover 11 for standing the net structure on its base. The handle 10 is also conveniently provided with a spring catch 12 which is adapted to snap over the belt of the user for carrying purposes. The handle is extended by means of a coupling 13 in which is secured a handle extension 14. The handle extension 14 terminates in a yoke 15 which is provided with diverging faces 16, Fig. 6 and in the embodiment shown, is further provided with abutment shoulders 17 having abutment faces 18.

A pair of diverging, net-carrying arms 20 are provided at their hinge ends with locking studs 21 and are pivotally mounted by the locking studs 21 to the yoke 15 adjacent the diverging faces 16, as by means of set screws 22. The arms 20 are connected at their extended ends by means of a resilient member 23 comprising a leather thong or rubber band, the arms 20 and the resilient member 21 serving to carry a net 24.

In the embodiment shown in Figs. 1 to 6, inclusive, the locking studs 21 are provided with abutment ends 25 which cooperate with the abutment faces 18 of the shoulders 17 for limiting the unfolding movement of the diverging arms 20. The locking studs 21 are further provided with inwardly and transversely extending lugs 26 adapted to cooperate and abut the yoke 15 for limiting the unfolding movement of the diverging arms 20.

Slidably mounted on the handle extension 14 is a locking member or sleeve 30 provided with a projection 31 having a longitudinally extended inner abutment face 32 adapted to cooperate with and abut the locking studs 21 for preventing the collapsible movement of the diverging arms 20. The sleeve 30 is further provided with an abutment end 33 which is adapted to cooperate with the lugs 26 for limiting the unfolding movement of the diverging arms 20. The sleeve 30 is urged over the locking studs 21, against the shoulders 17 and against the lugs 26, as by means of a resilient member or spring 34, thereby positively locking the hinge structure.

In Figs. 7, 8 and 9, after the locking studs seat against their respective stops, so that arms 20 are in alinement with 14, they are locked in such position by the sliding collar 30, which slides over the ends of the locking studs.

The net-carrying structure is conveniently carried in collapsed position by the user by means of the spring catch 12, as shown in Fig. 1, and it may be readily brought into use by gripping the handle 10 with one hand, disengaging the spring catch 12 from the belt of the wearer, and flipping the net-carrying arms 20 outwardly away from the handle 10, thereby unfolding the arms 20 in diverging paths. The arms 20 unfold in a diverging path due to the fact that the locking studs 21 carrying the arms 20 are pivotally mounted adjacent and bear against the diverging faces 16 of the yoke 15. It will be apparent that the abutment ends 25 of lugs 26 bear against the abutment end 33 of the locking sleeve 30, displacing the sleeve 30 and compressing the spring 34. The unfolding movement of the arms 20 continues until the abutment ends 25 of lugs 26 have passed contact with the abutment end 33 of the locking sleeve 30. At this point the sleeve 30 is urged toward the yoke 15 by the spring 34 until the abutment end 33 of the sleeve 30 contacts the lugs 26, the inner abutment face 32 of the sleeve 30 abutting the locking stud 21, thereby preventing collapsing movement of the diverging arms. In addition, the lugs 26 mounted on the locking studs 21 abut the yoke 15, thereby preventing further unfolding movement of the arms 20.

From the foregoing description it is apparent that the novel hinge and latch structure of the present invention provides both positive locking and collapsing means.

When the unfolding movement of the arms 20 has been limited by the abutment means, the inner abutment face 32 of the locking sleeve 30 is in contact with the locking studs 21, thereby positively preventing reverse motion or collapsing of the net structure. In collapsing the net structure, the user slides the locking sleeve 30 away from the yoke against the pressure of spring 33 until the inner abutment face 32 is out of contact with the locking studs 21 whereby the arms 20 are freed for collapsing movement. If the handle of the net is held in a horizontal position with the abutment projection 31 upright and with the sleeve 30 retracted out of contact with the upper face of the locking studs 21, the force of gravity acting on the arms 20, will serve to collapse the net.

It will be understood that the present invention is subject to various modifications without departing from the spirit and scope of the appended claim.

I claim:

A folding net comprising a handle, a yoke carried by said handle at one end thereof, a pair of net carrying arms pivoted to said yoke, said arms having a shorter portion just inwardly of their pivotal axes, said shorter portions being provided with inwardly and transversely extending stop lugs movable with said shorter portions and adapted to bear against one face of said yoke, said shorter portions being provided with abutment ends for limiting the movement of said arms in one direction, said yoke having abutment faces adapted to be engaged by said abutment ends to limit movement of said arms in said one direction, and a spring pressed collar having an extended flange adapted to slide over said abutment ends to limit the movement of said arms in the opposite direction, with said stop lugs in engagement with one face of said yoke, said collar flange contacting said abutment ends and said stop lugs in one position thereof.

DALE E. BELL.

REFERENCES CITED

The following references are of record in the file of this patent:

UNITED STATES PATENTS

| Number | Name | Date |
|---|---|---|
| 488,095 | Scott et al. | Dec. 13, 1892 |
| 2,093,455 | Knight | Sept. 21, 1937 |

FOREIGN PATENTS

| Number | Country | Date |
|---|---|---|
| 2,560 | Great Britain | A. D. 1885 |
| 9,804 | Great Britain | A. D. 1895 |
| 12,887 | Great Britain | A. D. 1896 |
| 425,565 | Great Britain | Mar. 18, 1935 |
| 6166/32 | Australia | Feb. 17, 1932 |